(12) United States Patent
Forlong

(10) Patent No.: US 9,669,560 B2
(45) Date of Patent: Jun. 6, 2017

(54) CUTTING MACHINE WASTE EXTRACTION APPARATUS

(75) Inventor: Murray Houlton Forlong, Auckland (NZ)

(73) Assignee: EIGEN SYSTEMS LIMITED, Auckland (NZ)

( * ) Notice: Subject to any disclaimer, the term of this patent is extended or adjusted under 35 U.S.C. 154(b) by 488 days.

(21) Appl. No.: 14/241,218

(22) PCT Filed: Aug. 31, 2012

(86) PCT No.: PCT/NZ2012/000154
§ 371 (c)(1),
(2), (4) Date: Feb. 26, 2014

(87) PCT Pub. No.: WO2013/073963
PCT Pub. Date: May 23, 2013

(65) Prior Publication Data
US 2014/0202296 A1    Jul. 24, 2014

(30) Foreign Application Priority Data
Sep. 2, 2011 (NZ) ....................... 594980

(51) Int. Cl.
*B23P 23/04* (2006.01)
*B08B 15/00* (2006.01)
(Continued)

(52) U.S. Cl.
CPC .......... *B26D 7/1863* (2013.01); *B08B 15/005* (2013.01); *B23Q 1/0027* (2013.01);
(Continued)

(58) Field of Classification Search
CPC .................................................. B08B 15/005
See application file for complete search history.

(56) References Cited

U.S. PATENT DOCUMENTS 2,923,227 A * 2/1960 Hawley .................. B08B 15/005
266/158
3,478,668 A * 11/1969 Scheel et al. .......... B08B 15/005
454/64
(Continued)

FOREIGN PATENT DOCUMENTS

DE         462135 C  *  7/1928
DE         1560308      1/1971
DE         19501990     7/1996

OTHER PUBLICATIONS

Machine Translation DE 462135, which DE '135 was published Jul. 1928.*
(Continued)

*Primary Examiner* — Erica E Cadugan
(74) *Attorney, Agent, or Firm* — Greer, Burns & Crain, Ltd.

(57) ABSTRACT

A cutting machine waste extraction apparatus is provided for a cutting machine that cuts a plate where the cutting machine waste extraction apparatus is supported adjacent a cutting area at a cutting table. The cutting machine produces waste at the cutting area during the cutting of the plate where the apparatus includes a ducting system having a first duct that receives the waste from the plate, and a second duct that receives the waste from the first duct. The first duct is movable along the length of the second duct and the second duct includes a lengthwise opening which is sealed by a flexible belt. The flexible belt is deformable from sealed contact with the second duct, adjacent a junction apparatus, where the junction apparatus provides a fluid connection between the first duct and the second duct.

14 Claims, 5 Drawing Sheets

(51) Int. Cl.
*B23Q 11/00* (2006.01)
*B23K 28/02* (2014.01)
*B23C 1/06* (2006.01)
*B26D 7/18* (2006.01)
*B23Q 1/00* (2006.01)
*B23Q 1/01* (2006.01)
*F16L 41/18* (2006.01)
*B23Q 39/02* (2006.01)
*B23K 26/00* (2014.01)
*H01H 1/26* (2006.01)
*B23C 1/00* (2006.01)

(52) U.S. Cl.
CPC .......... *B23Q 1/012* (2013.01); *B23Q 11/0046* (2013.01); *B23Q 11/0075* (2013.01); *B23Q 39/021* (2013.01); *F16L 41/18* (2013.01); *B23B 2270/62* (2013.01); *B23C 1/002* (2013.01); *B23C 1/06* (2013.01); *B23C 2230/08* (2013.01); *B23K 26/0093* (2013.01); *B23P 23/04* (2013.01); *B23Q 39/022* (2013.01); *B23Q 2240/002* (2013.01); *H01H 1/26* (2013.01); *Y02P 70/171* (2015.11); *Y10T 29/5107* (2015.01); *Y10T 83/207* (2015.04); *Y10T 83/2092* (2015.04); *Y10T 408/50* (2015.01); *Y10T 409/304088* (2015.01); *Y10T 409/308288* (2015.01)

(56) References Cited

U.S. PATENT DOCUMENTS

| | | | |
|---|---|---|---|
| 3,842,580 A | 10/1974 | Franzen | |
| 3,877,334 A | 4/1975 | Gerber | |
| 4,086,847 A * | 5/1978 | Overmyer | B08B 15/005 104/52 |
| 2008/0216625 A1 | 9/2008 | Li et al. | |
| 2010/0043501 A1 | 2/2010 | Zorzolo et al. | |

OTHER PUBLICATIONS

Extended European Search Report issued in EP Application 12 85 0097, mailed Apr. 30, 2015.

* cited by examiner

DETAIL J

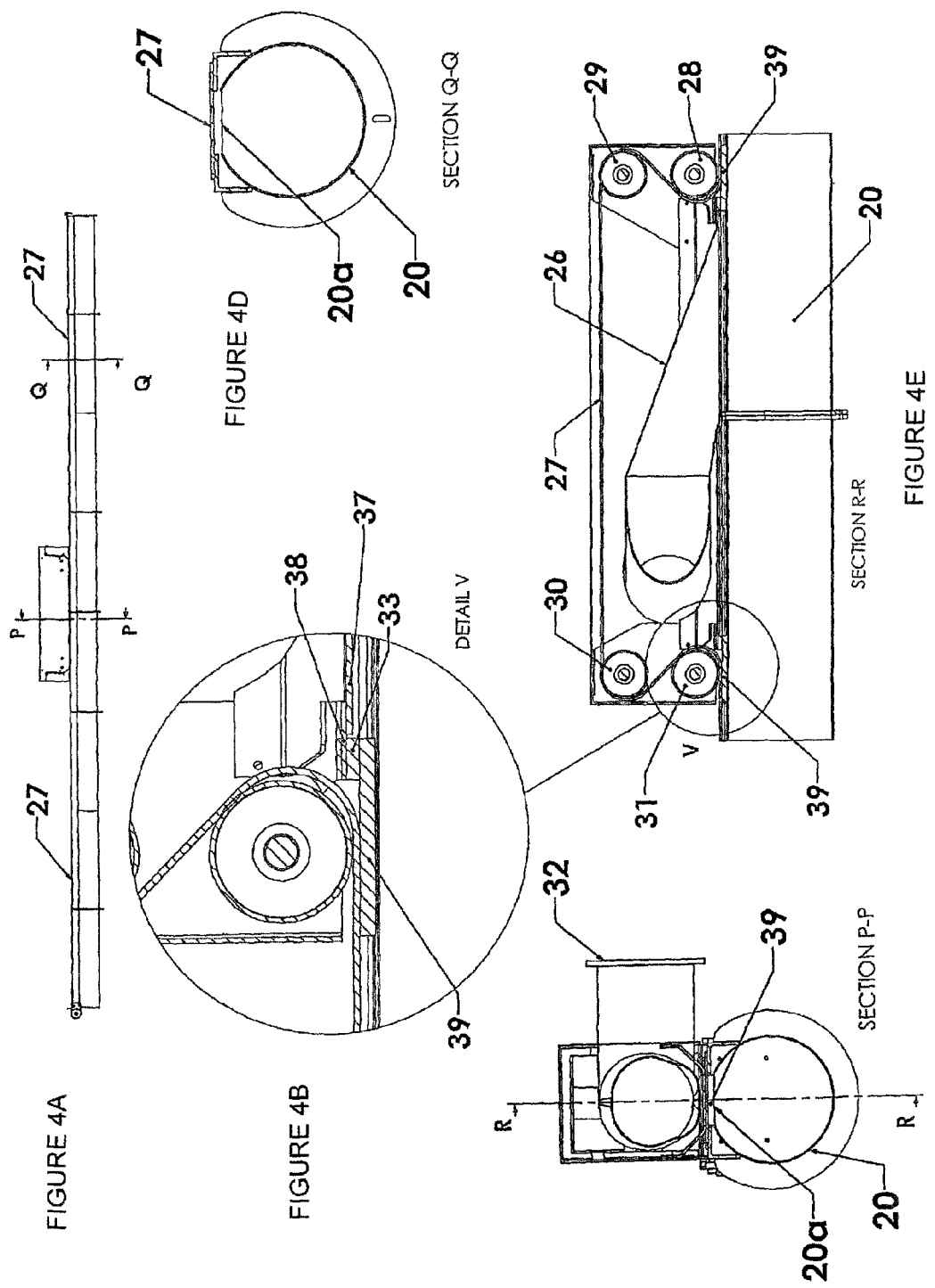

CUTTING MACHINE WASTE EXTRACTION APPARATUS

The invention relates to a cutting machine waste extraction apparatus. The waste extraction apparatus enables profile cutting machines that cut part profiles from flat material to remove coolant and chip waste. The invention is directed particularly but not solely towards cutting machines using coolant and having machining spindles that generate machining chips, to enable the direction and extraction of the coolant and chips away from the cutting area. The invention also relates to ducting apparatus. More particularly, the invention relates to ducting enabled to transfer waste in the form of coolant and chips between two ducts, one moveable along the length of the other.

BACKGROUND

Many parts or profiles cut from large metal plates will require a process to sever the part profile from the large plate such as by thermal cutting means. The part or profile may also require machining operations such as drilling or milling performed by a machining head such as a cutting tool with through spindle coolant. Typically, the machining operations are performed prior to the outer profile being cut and the part being severed, to ensure the part is supported during the machining operations.

Therefore, on some profile cutting machines, the bridge of the machine is often fitted with thermal cutting means including thermal cutting heads such as laser, oxy fuel and plasma cutting torches and also with machining heads with high speed spindles for machining operations.

Currently when cutting out parts from plate using the thermal cutting heads such as oxy fuel or plasma, the waste from this type of cutting falls below the plate being cut either into a void with water or coolant or alternatively the waste falls to the floor of the support structure and the fumes from the cutting is extracted from beneath the table supports.

When machining operations are performed on this style of profile cutting machine, the waste, in the form of chips or swarf, remains on top of a surface of the plate being cut. Also, the chips formed from machining operations are sharp and therefore not easily removed.

Currently, profile cutting machines that generate chips have fixed systems such as conveyors o to convey the chips away. However, the chips are required to be manually swept with a broom or similar or blown with a compressed air gun towards the conveyor.

Currently, cutting systems such as routers or other wood working machinery with a machining head that generate dry light chips such as wood chips or aluminium are often installed with a flexible plastic duct so that these chips can be extracted from the surface of the plate by applying a vacuum to the flexible plastic duct. Typically the flexible plastic duct is fitted with spiral steel reinforcing to prevent the duct collapsing from the vacuum. The flexible plastic duct extracts air and chips from the area around the machining head.

This flexible duct chip extraction system does not work very well for steel as the sharp hot chips bind to the flexible duct and spirals and block the flexible duct. Additionally this method only works for small cutting machines where the travel in the flexible ducts is kept to a minimum as metal chips cannot be reliably transported along flexible ducting due to chips catching on the soft material of the flexible duct and blocking the duct.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT

It is an object of the invention to provide an improved cutting machine waste extraction apparatus, to enable waste from large combination machine and thermal cutting machines cutting steel, to be fitted with machining heads, to extract machining waste from the surface of the plate being machined and/or ameliorates some of the disadvantages and limitations of the known art or at least provide the public with a useful choice.

SUMMARY

In a first embodiment the invention comprises a cutting machine waste extraction apparatus for a combined machining and thermal cutting machine for cutting in horizontal planes which produces waste such as coolant and chips at a cutting area on a cutting table, the cutting machine waste extraction apparatus including ducting system and junction apparatus such that waste from cutting can be removed from the cutting area through a movable ducting system, the movable ducting system constructed to receive and direct waste from the cutting area, from a vertical plane to a horizontal plane wherein a portion of the ducting system is fluidly connected by the junction apparatus to another portion of the ducting system, whereby in the horizontal plane at least a portion of the ducting is able to move with respect to other ducting wherein the junction apparatus includes a movable junction ducting for directing waste flow from one direction to be directed to another direction in a ducting, the ducting being shaped to have at least one movable flexible belt located to cover and seal the ducting, whereby the junction apparatus includes said belt being movably supported by rollers to be slidably raised above a portion of the ducting to allow the junction apparatus to be movable along the ducting to allow waste therein while being continuously fluidly sealed.

Preferably the ducting at the movable junction has a raised cover to cover a portion of the flexible belt which is attached to the rollers to allow the raised cover to move with the movable junction when the movable junction moves along the ducting wherein the ducting is a horizontally oriented ducting.

Preferably the junction apparatus enables one axis to be fluidly joined to another axis which is such that waste can be transferred at any point along a horizontal duct via a top opening along the horizontal ducting length.

Preferably the ducting system includes in sequence the following ducting or ducts fluidly connected together including a combined plate clamp and coolant guard 4 shaped and oriented as a hollow member to receive or draw in waste from the cutting area, then move the waste upwardly through a first substantially vertical duct 13, then upwardly through a second substantially vertical duct 14, then through a ducting called a first horizontal duct 18, then to the junction apparatus which includes a first junction apparatus 19 as a movable assembly on the ducting which comprises another ducting called a second horizontal duct 20 and then through the second horizontal duct 20 as in a Y axis, through to a second junction apparatus 21 and then through yet another ducting called a third horizontal duct in the X axis of 22 and finally to a connection point 23 to an extraction fan and separation system.

Preferably the said ducting which includes a first horizontal ducting 18, a second horizontal duct 20 and third horizontal ducting 22 are in different horizontal planes whereby the first horizontal duct 18 is located higher than the second horizontal duct 20 whereby the third horizontal duct 22 is located below the second horizontal duct 20.

Alternatively the third horizontal duct 22 is fluidly joined to the second horizontal duct 20 by a second vertical duct 34 wherein the third horizontal duct is located below the cutting area.

Preferably the first junction apparatus 19 or second junction apparatus 21 includes a right angle joint including a funnel 26 and elbow joint 35, to move the waste from one horizontal direction to another horizontal direction at right angles.

Preferably each junction apparatus supports four rollers 28, 29, 30 and 31 to lift the flexible belt 27 off a surface of the second or third horizontal duct 20 or 22 exposing an opening 20a in the top of the horizontal ducting 20 or 22 such that the opening 20a is fluidly connected to chambers and sealed around the outside of 26 between rollers 28 and 31 with a flexible seal 33 onto the second and third horizontal ducts 20 and 22 to be continuously fluidly sealed.

Preferably the flexible belt extends the length of the second and third horizontal ducts to seal there against a top portion except for at least one location thereon whereby the waste can enter the second or third horizontal duct only at the position of the first and second junction apparatus wherever they are on the second and third horizontal ducts.

Preferably outside of the funnel 26 there is a sliding seal 33 that sits on top of second and third horizontal duct 20 and is flexibly connected to the funnel 26 such that as first junction apparatus 19 or second junction apparatus 21 is moved along the second or third ducts 20 the sliding seal 33 minimises air leaks at the junction of the funnel 26 and the opening 20a between one roller 28 and another roller 31 wherein the sliding seal 33 includes a plastic perimeter frame, which sits on top of the horizontal duct 20 or 22 having the opening there between whereby a metal perimeter frame as supported by the funnel 26, raised cover and rollers, is smaller than the plastic perimeter frame forming a perimeter gap between the plastic cover and steel frame, which is sealed by a flexible sealing member 38 which is joined to the plastic frame.

Preferably the combined machining and thermal machine incorporates a movable carriage with cutting heads including a thermal cutting head and machining head, having movable cutting tools.

Preferably the cutting tools are movably mounted to be directed to move vertically in a Z axis whereby each cutting tool has its own guide system.

Preferably the carriage is movably mounted on a gantry 2 whereby the carriage 3 is movably mounted to be able to be moved in a horizontal direction in a Y axis and the gantry is guided to travel horizontally in a X axis whereby the movement of the carriage with respect to the gantry are at right angles to each other.

Preferably the machining head of the combined machining and thermal machine includes a machining spindle which incorporates its own system to contain and remove and recycle the coolant and machining chips above the plate during machining.

Preferably the ducts comprise-rigid ducting in the X, Y and Z axis and incorporate a suction system for the machine chips to enter the cutting waste extraction apparatus anywhere along the X and or Y axis.

Preferably the first vertical duct and second vertical duct include a telescoping means to allow for vertical Z axis movement of the first vertical duct with respect to the second vertical duct to a position to allow the cutting head to be moved accordingly during cutting.

Preferably the cutting machine waste extraction apparatus is able to move along the X axis and Y axis in response to movement of the carriage on the gantry and move vertically, while still able to at all times, push or draw in waste from the cutting and outwards to the third horizontal duct 22.

In a second embodiment the invention comprises a combined machining for cutting in horizontal planes which produces waste such as coolant and chips at a cutting area on a cutting table, the machine including a cutting machine waste extraction apparatus including ducting system and junction apparatus such that waste from cutting can be removed from the cutting area through a movable ducting system, the movable ducting system constructed to receive and direct waste from the cutting area, from a vertical plane to a horizontal plane wherein a portion of the ducting system is fluidly connected by the junction apparatus to another portion of the ducting system, whereby in the horizontal plane at least a portion of the ducting is able to move with respect to other ducting wherein the junction apparatus includes a movable junction ducting for directing waste flow from one direction to be directed to another direction in a ducting, the ducting being shaped to have at least one movable flexible belt located to cover the ducting, whereby the said belt is movably supported by rollers to be slidably raised above a portion of the ducting to allow the junction apparatus to be movable along the ducting.

BRIEF DESCRIPTION OF THE DRAWINGS

The invention will now be described, by way of example only, by reference to the accompanying drawings:

FIG. 3B depicts Detail J which is a close up of part of FIG. 3A.

FIG. 4A is a side elevation of the ducting and intersection and FIGS. 4C, 4D and 4E are cross-section views along section lines P-P, Q-Q, and R-R, respectively, showing how the chips are transferred from one duct to another perpendicular duct. FIG. 4B is a close up view depicting Detail V.

DETAILED DESCRIPTION

The following description will describe the invention in relation to preferred embodiments of the invention which is a cutting machine waste extraction apparatus, for a machine incorporating a machining head and thermal cutting heads which is for cutting a plate from a parent plate, in horizontal whereby such cutting produces machine waste such as coolant and chips from machining operations and fumes from thermal cutting, at a cutting area on a cutting table. The cutting machine waste extraction apparatus of the current invention as shown in FIGS. 1-5 including Detail J and Detail V and Sections P-P, Q-Q and R-R, enables machine chip extraction on such large combined machines via movable ducting systems including vertical telescoping ducts and moving entry point ducts for long axis chip removal.

The invention is in no way limited to these preferred embodiments as they are purely to exemplify the invention only and that possible variations and modifications would be readily apparent without departing from the scope of the invention.

When machining operations are carried out by the cutting machine on flat plate, the resultant waste from the machining operations often is left sitting on a surface of the plate being machined such as occurs when drilling a hole in the steel plate.

Figure 1:
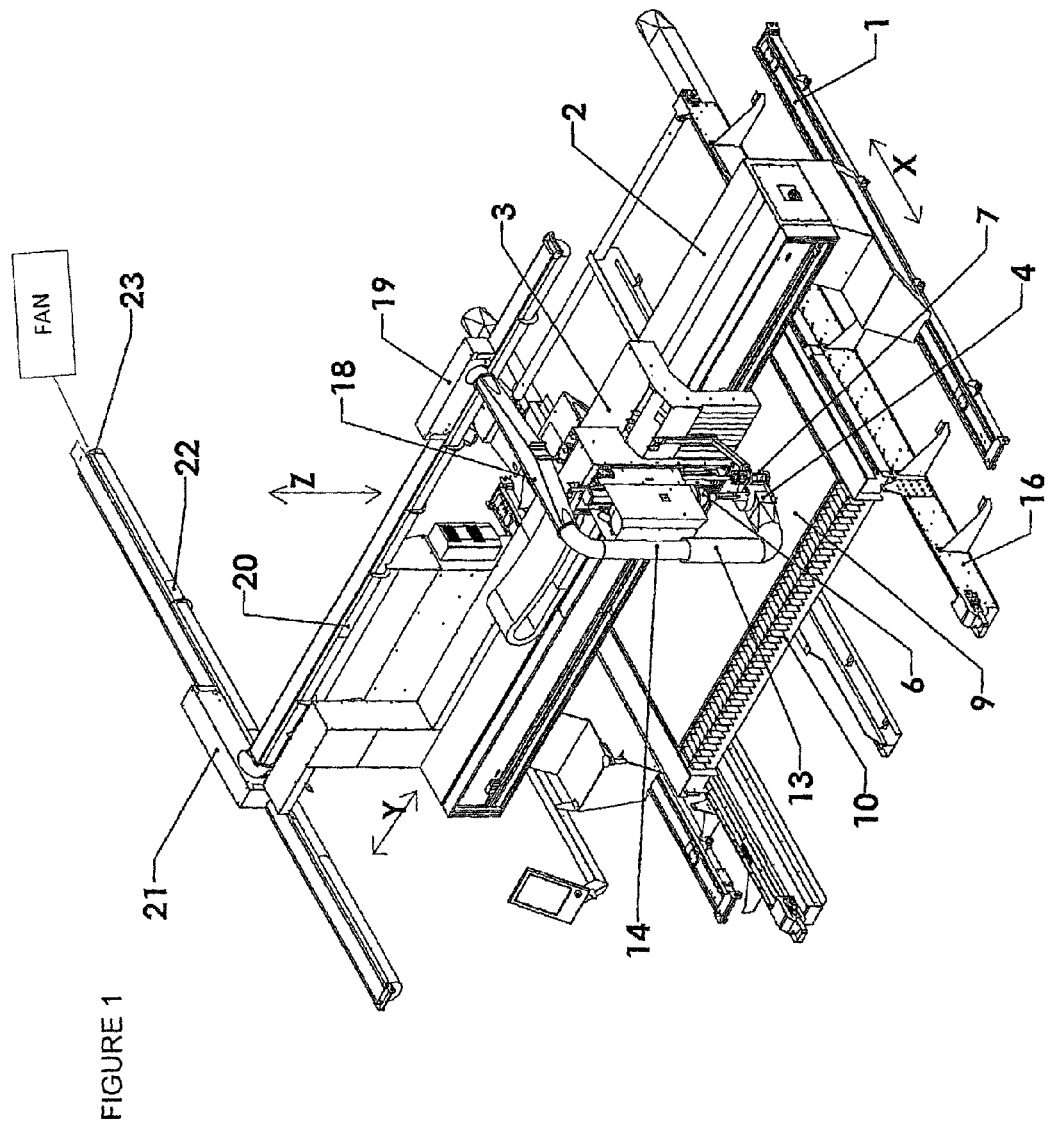
FIG. 1 is a schematic representation of the machine assembly in accordance with a first preferred embodiment of the invention.

FIG. 1 is a schematic showing a cutting machine with rails 1 and a machine gantry 2 that travels in a horizontal plane in an X axis along cutting machine rails 1. The cutting machine also has a carriage 3 movably mounted on the gantry 2 which is adapted to also move in the horizontal direction substantially at right angles to the travel of the gantry 2. The embodiment shows the cutting machine with a short X and Y axis travel as compared to most cutting machines however this invention is particularly suited but not limited to machining cutting and thermal cutting machines with long horizontal X and Y axis travel and this can often be to over 100 foot (or 30 meters) in travel.

Carriage 3 is fitted with at least one machining head 6 and at least one thermal cutting head 7 such that carriage 3 is constructed and adapted to travel in a horizontal plane in a Y axis along rails 1. Each cutting head includes at least one cutting tool with their own guide system which is adapted to operatively move each cutting tool in a vertical plane or direction in a Z axis. In this embodiment the machining spindle head includes a machining cutting tool, and the thermal cutting head includes a plasma torch (please note that in the figures any connecting hoses to the plasma torch are removed for clarity). Each of machining head 6 and thermal cutting head 7 is fitted with an individual Z axis drive to vertically raise and lower the tool vertically in the Z axis to a plate 9 to be cut.

In this instance there is a combined plate clamp and waste guard 4 surrounding the machining head 6 which has an independent Z axis drive which enables a combined plate clamp and coolant guard 4 to move vertically independently with respect to the machining head 6 and thermal cutting head 7 when in use and prior to the machining operations of machining head 6. Combined plate clamp and coolant guard 4 is shaped as a hollow member with a wide entrance end.

In FIG. 1 the plate 9 is supported on a cutting table 10 which supports the plate 9 during the various cutting and/or machining or thermal cutting processes and enables a fume extraction system (not shown) to be mounted under the cutting table 10 for fume extraction during thermal cutting processes by thermal cutting head 7. The cutting table 10 is mounted on table mounting side supports, located on the side or near the end of the gantry, being located immediately adjacent and separate to each guide rail 1.

As shown in FIG. 1 the combined plate clamp and waste guard 4 surrounding the machining head 6 is positioned so that when machining operations occur any solid waste such as chips created, are evacuated up into a first vertical duct 13 and into a second vertical duct 14 which can accommodate vertical movements of the combined plate clamp and coolant guard 4 and vertical duct 13 which are rigidly and fluidly connected. In this example the second vertical duct 14 is formed of a smaller diameter to enable the second duct 14 to telescope within the first vertical duct 13 when the ducting needs to move vertically with a seal between the ducts connected to the end of second vertical duct 14.

The cutting waste such as chips and coolant, enters the combined plate clamp and coolant guard 4 and moves up first vertical duct 13 and travels vertically up second vertical duct 14 along ducting called a first horizontal duct 18 into a junction apparatus in the form of a first junction apparatus 19 which is adapted to movably take waste from one axis to another axis at right angles. The air with chips and coolant are then transferred through the first junction apparatus 19 down into another ducting called a second horizontal duct 20 and then down along through another junction called a second junction apparatus 21 which is adapted to movably take waste from one axis to another axis at right angles, down into yet another ducting called a third horizontal duct 22 (see FIG. 2 which shows this third horizontal duct 22 to be lower than the second horizontal duct 20).

Figure 5:
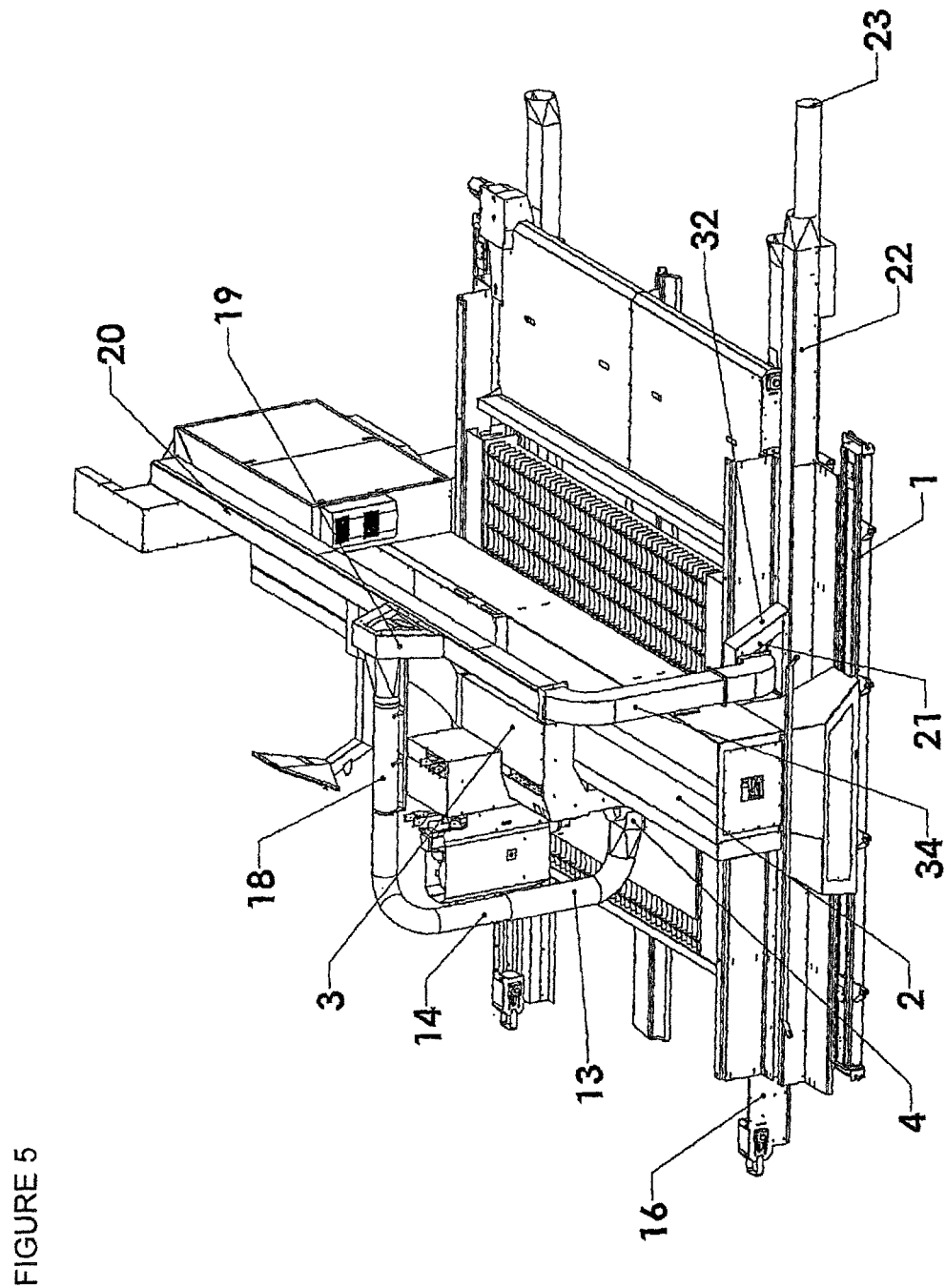
FIG. 5 is a schematic representation of the waste extraction apparatus with the second junction apparatus located close to the machine rails.

The ducting which are all horizontally oriented includes a first horizontal ducting 18, a second horizontal duct 20 and third horizontal ducting 22 are in substantially similar horizontal planes but separated by small vertical drops whereby the first horizontal duct 18 is located higher than the second horizontal duct 20 whereby the third horizontal duct 22 is located below the second horizontal duct 20. As shown in FIG. 5 in a variation the downwards drop to the third horizontal duct 22 is fluidly joined to the second horizontal duct 20 by a vertical duct 34 wherein the third horizontal duct 22 is located below the cutting area.

The first vertical duct 13 and second vertical duct 14 are located on one side of the carriage 3 above the cutting table 10. The first horizontal duct 18 is oriented parallel to the rails 1 or X axis and located above the carriage 3. The second horizontal duct 20 is located lower in height from the ground than the first horizontal duct 18 and is oriented in an axis parallel with the Y axis or parallel with the gantry 2. The third horizontal duct 22 is parallel to the guide rails 1.

First junction apparatus 19 is movably supported above the carriage 3 by the second horizontal duct 20. Second horizontal duct 20 can be formed so that it has an upper portion or all of its cross section which can function as both a ducting and support like member and is oriented as a straight length in the horizontal Y axis and can also function to support the first junction apparatus 19 to be above the carriage 3 but be located behind the gantry 2 as shown in the figures.

Third horizontal duct 22 is oriented in the horizontal X axis, is fluidly connected to the connection point 23 which is in turn fluidly connected to a suction fan (schematically shown in FIG. 1) so that when the fan is turned on the air enters combined plate clamp and coolant guard 4 at a high velocity and extracts or draws machining chips and coolant from the local cutting area. The side supports 16 are positioned and supported by the same substrate (e.g., ground or factory floor) that supports the rails 1 and are oriented parallel but inside to the rails 1 but are located under the gantry 2. First horizontal duct 18, second horizontal duct 20 and third horizontal duct 22 are shown as being in a horizontal plane.

As shown in FIG. 1 the connecting ducting from the combined plate clamp and coolant guard 4 through the first junction apparatus 19 as a whole, is connected to the carriage 3 so that as the carriage 3 travels in the Y axis, then the combined plate clamp and coolant guard 4, first vertical duct 13, second vertical duct 14 and first junction apparatus 19 as an assembly moves correspondingly in the Y axis independently of the second horizontal duct 20 and movement up and down of the cutting tools and movement of the gantry 2 along the guide rails 1 or in combination as required.

Figure 2:
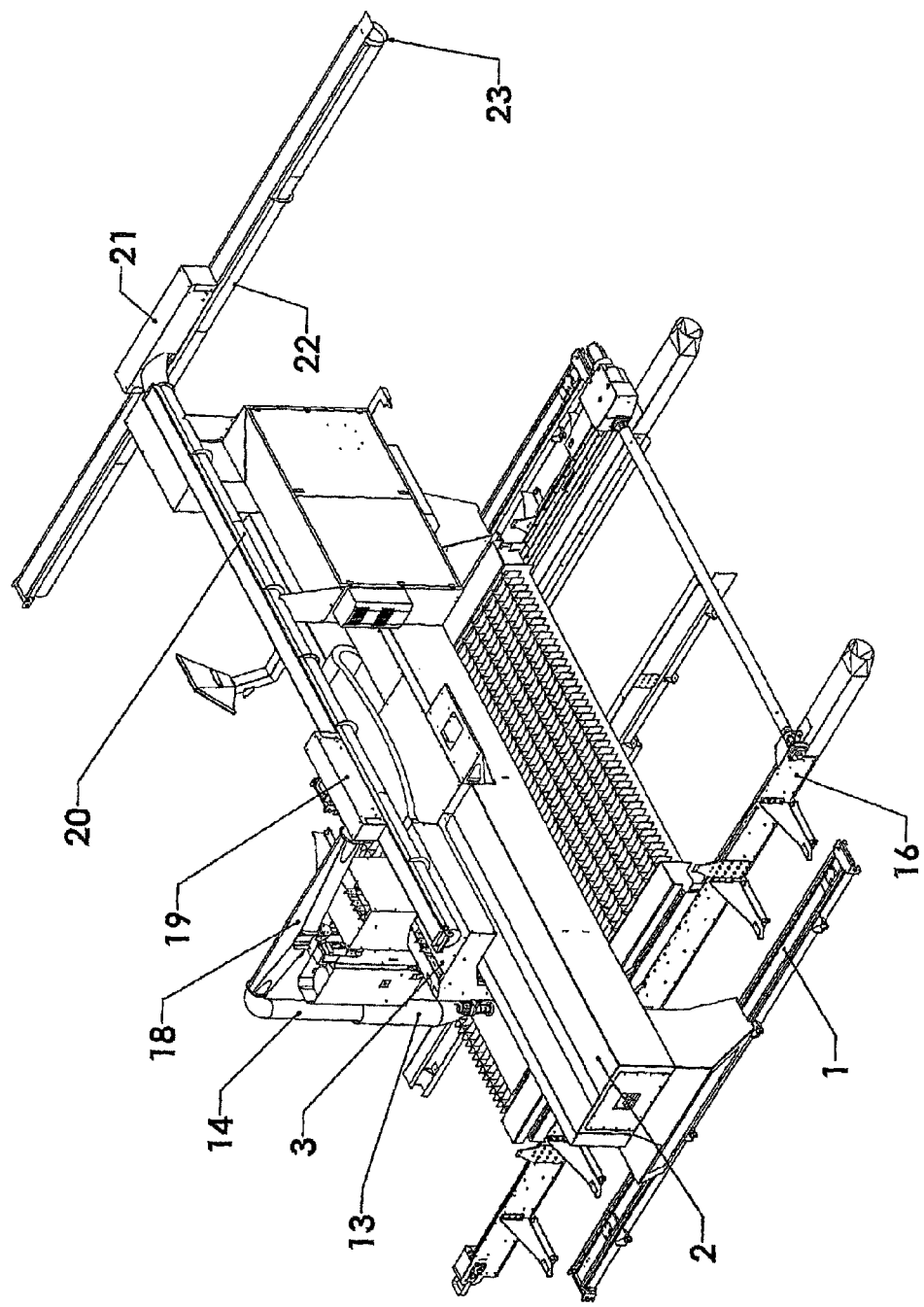
FIG. 2 is a schematic representation showing the machine from the back view.

FIG. 2 shows how second horizontal duct 20 is fluidly connected to the first junction apparatus 19, and includes a second junction apparatus 21, which is fluidly connected to the third horizontal duct 22 and finally to an exit from the machine via connection point 23.

Importantly the first junction apparatus 19 is a movable junction of two right angle ducting systems in a horizontal plane which meet at a first junction which transitions the air movement with the chips and coolant from the X axis first horizontal duct 18 (above carriage 3) to the Y axis second horizontal duct 20 in such a way that as first junction apparatus 19 moves along second horizontal duct 20 (ie on a Y axis) then the transition at the junction between the two axes is moved accordingly.

Importantly the second junction apparatus 21 is a movable junction of two ducting systems which meet at second junction in a horizontal plane which transitions the air movement with the chips and coolant from the Y axis of second horizontal duct 20 to the X axis of third horizontal duct 22 in such a way that as second junction 21 moves along third horizontal duct 22 (ie on a X axis) then the transition at the junction between the two axes is moved accordingly.

A critical point of this embodiment is the junction of two ducting systems that allow chips and coolant to be entered at any point from above the Y axis and above in the X axis to then be directed away to an extraction system while simultaneously allowing the carriage cutting tools and gantry to move.

Therefore the ducting system includes in sequence:
combined plate clamp and coolant guard 4 (being hollow tubular member having a wide end at its entrance end) adapted to receive and contain the waste from the cutting area and direct it upwards,
up through first vertical duct 13 leading to a second vertical duct 14,
through first horizontal duct 18,
then to and through first junction apparatus 19, which forms a movable assembly with the carriage 3,
along and through second horizontal duct 20 in Y axis.
and down through to second junction apparatus 21 which is movably above to the third horizontal duct 22,
and exit out from the machine, through connection point 23.

Figures 3A, 3B:
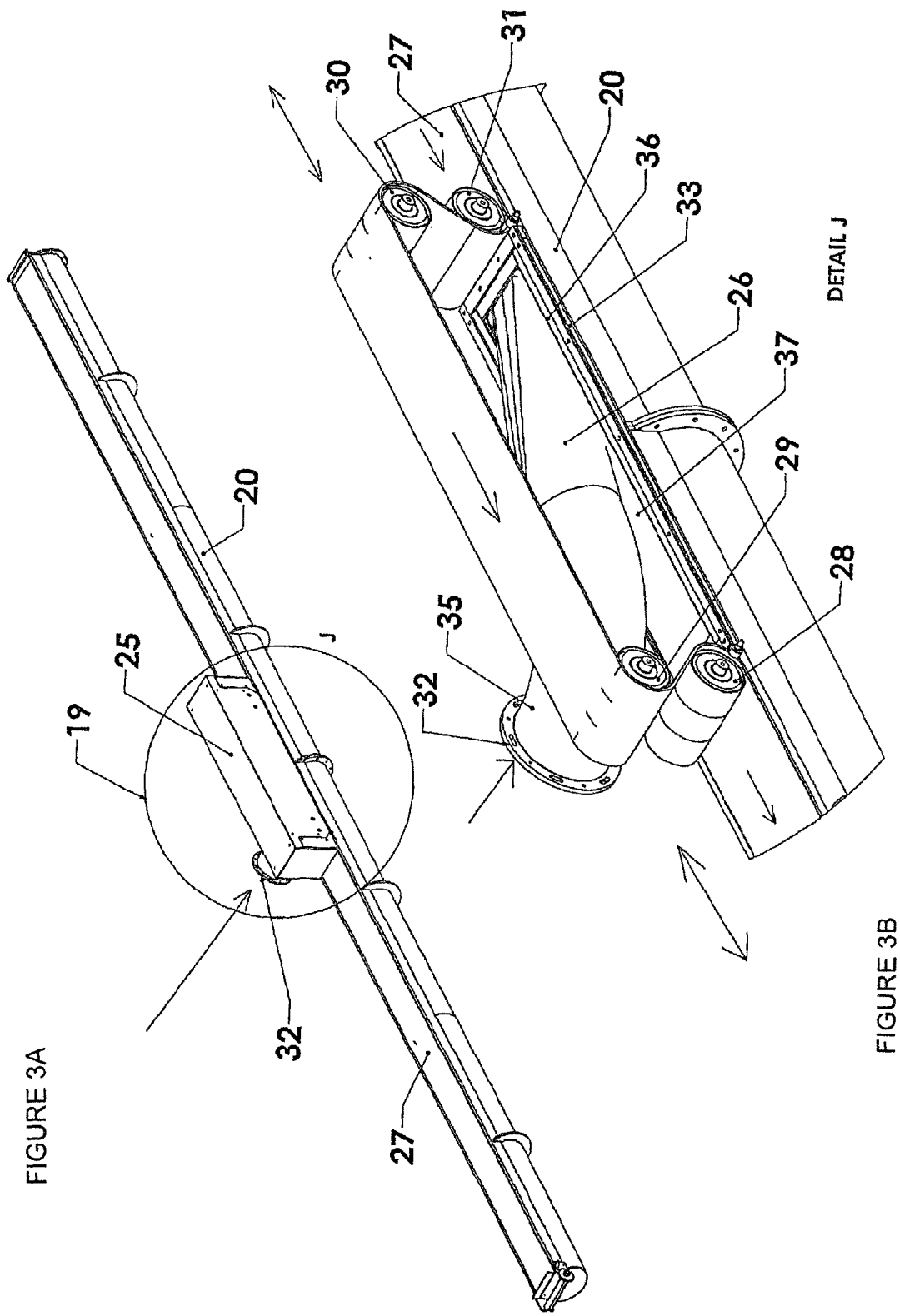
FIGS. 3A and 3B are section views showing the intersection detail between two extraction ducts with top cover of the intersection in Detail J of FIG. 3B removed for clarity.

FIG. 3A including Detail J, are sectioned views of the first junction apparatus 19 between the first horizontal duct 18 and second horizontal duct 20 and in this illustration is the detail of first junction apparatus 19 from FIGS. 1 and 2. In this representation Detail J, the raised cover 25 of the first junction apparatus 19 is removed to illustrate how this first junction apparatus 19 functions. Second horizontal duct 20 being a duct having a length similar to the length of the gantry 2 and including a length wise upwardly pointing slotted opening along its entire length which is movably covered by a flexible belt 27 whereby there is a movable slot opening 20a (shown in FIG. 4A) in the upwardly pointed length wise slot, which is located at the top of the second horizontal duct 20.

FIG. 3A, Detail J of the first junction apparatus 19 (or similarly for second junction apparatus 21), has some of the raised cover 25, ie the sides, removed for clarity and shows the funnel 26 transition and elbow joint 35 that fluidly connects flange 32 and first horizontal ducting 18 to the opening slot 20a (shown in FIG. 4A) whereby the belt 27 is lifted off the top of the second horizontal ducting 20 (or third horizontal ducting 22) by rollers 28 and 31 and the belt is raised over the funnel 26 by rollers 29 and 30 such that the slot on the top of horizontal duct 20 (or horizontal ducting 22) is open between rollers 28 and 31 and then the belt is lowered to seal the second horizontal duct 20 or third horizontal duct 22, after the movable junction has passed.

As shown in FIG. 3A, Detail J, rollers 28 and 31 almost rest on the top of second horizontal duct 20 or third horizontal duct 22 but there is a part of the belt in between whereby rollers 29 and 30 are spaced above such that the pair of rollers 28 and 29 are one above the other while another pair of rollers 31 and 30 are one above the other except for a part of the belt 27 in between each pair of rollers 28, 29 or 30, 31. As shown the belt 27 is wrapped around each pair of rollers in a "S" shape to come in at the bottom horizontally to then go around a pair of rollers 28, 29 to move upwards in a S shape to then go horizontally to cover the junction and go back down the other pair of rollers 31, 30 to then carry on sealing the top of the second horizontal duct 20 or third horizontal duct 22.

FIGS. 4A, 4B, 4C, 4D and 4E with Detail V and sections P-P, Q-Q and R-R, show sectional views through second horizontal duct 20 (or third horizontal duct 22) and shows the slot 20a in the top of the ducting which is covered by flexible belt 27. Also shown is section P-P which is a section through second horizontal duct 20, section QQ is a section through the second horizontal duct 20 or third horizontal duct 22 outside of the junction and section R-R which is a section through and parallel to ducting 20.

Waste from the cutting area enters the flange 32 and around the ducting elbow and into funnel 26 which leads to then be pushed or drawn down into the opening slot 20a of the second horizontal duct 20.

Pulleys or rollers 28, 29, 30 and 31 are shaped and located to allow movement of the carriage along the gantry 2 and first junction apparatus 19 of the combined plate clamp and coolant guard 4 with the first vertical duct 13, second vertical duct 14 and first horizontal duct 18 along second horizontal duct 20 to allow waste to enter the slot opening 20a of the second horizontal duct 20. Belt 27 extends the length of second horizontal duct 20 to cover the upwardly facing slotted opening along its complete length except where the first junction apparatus 19 is located on the second horizontal duct 20, where there is the opening between rollers 28 and 31. The movable belt 27 abuts the top of the slot to fluidly seal second horizontal duct 20 as required (not leak) but is spaced above the slot between roller 28 and 31 wherever that may be along the length of the second horizontal duct 20.

As the carriage 3 is able to move along the gantry 2 in a horizontal plane in a Y axis, the combined plate clamp and coolant guard 4 and first vertical duct 13, second vertical duct 14 and first horizontal duct 18 with first junction apparatus 19 move along second horizontal duct 20. As the first junction apparatus 19 moves along the second horizontal duct 20, the flexible belt 27 which covers the slot 20a along the length of the duct 20 is raised around lower rollers 28 or 31 and horizontally up to and over rollers 29 and 30 then down to roller 31 or 28 and back down flat onto the top of duct 20.

As the assembly and first junction apparatus 19 is moved along the top of the second horizontal duct 20, the movable flexible belt 27 is raised to open the slot 20a at the junction so that chips can enter duct 20 at slot 20a. Flexible belt 27 ensures the top opening of second horizontal duct 20 is sealed at all other points along second horizontal duct 20.

Outside of funnel 26 is a sliding seal 33 that sits on top of second horizontal duct 20 and is flexibly connected to funnel 26 such that as first junction apparatus 19 is moved along second horizontal duct 20 the sliding seal 33 minimises air leaks at the junction of funnel 26 and slot 20a between roller 28 and roller 31.

As shown in FIGS. 3A and 4A to 4E including the Details and Sections, the sliding seal 33 is formed as a piece of plastic cut out like a picture frame that sits on top of the second horizontal duct 20 or third horizontal duct 2422 with an inside opening size of the plastic sliding seal matching a steel frame 37 welded to the bottom of funnel 26. The steel frame 37 is held just off the second horizontal duct 20 or third horizontal duct 22 so that it doesn't rub on the second horizontal duct 20 or third horizontal duct 22. The outside of the steel frame 37 is just marginally smaller than the inside of the plastic sliding seal 33 to form a perimeter gap therebetween.

A flexible sealing member such as a rubber seal 38 is screwed to the top of the sliding seal 33 and the rubber seal 38 seals on the top of a steel frame 37 that is welded to the bottom of funnel 26 so that when the pressure in the second horizontal duct 20 or third horizontal duct 22 is reduced, the rubber seal 38 covers the perimeter gap to prevent leaks. The steel frame 37 is supported above the second horizontal duct 20 or third horizontal duct 22, by funnel 26 which is supported by the rollers 28-31 with inclined supports, connected to the raised cover 25. In FIG. 4A, there is also shown a plastic piece 39 shown in Section RR that is located in the slot 20a and under roller 31 and 28, to seal a central gap between the sliding seal 33 and the roller 31 and 28. These plastic pieces 39 go under the rollers 31 and 28 and the top of the plastic pieces 39 is coincident with the bottom of the roller 31 and 28 the bottom of belt 27 and bolt up to the sliding seal 33.

FIG. 4A shows a junction and section view P-P and section view Q-Q. The section view R-R shows the first junction apparatus 19 with the cover removed to show the route of the coolant and cutting chips through the junction from one ducting system to the next.

Section Q-Q shows the section through the second horizontal duct 20 and shows the top open slot 20a that runs the length of the slot.

Section P-P shows how the entry into the first junction apparatus 19 from connection of duct 18 at flange 32 is ducted down into duct 20 and through the entry of the slot 20a.

Second junction apparatus 21 and third horizontal duct 22 can have similar structures to the first junction apparatus 19 and second horizontal duct 20 to allow it to receive waste from above and below and be able to allow the second junction apparatus 21 to move along the top of the third horizontal duct 22. Second junction apparatus 21 has funnel means and roller means similar to first junction apparatus 19.

Where various sections of duct meet or intersect with other ducts, there can be curved or graduated changes in volume, shape and direction to ease the flow of waste there through.

The present invention in preferred embodiments may have one or more of the following advantages:
a) Solid metal ducting apparatus can be used to allow for vertical movements and eliminate the need for flexible ducts
b) Solid metal ducting apparatus enables a machining head moving in the X, Y and Z directions to have chips and/or cutting fluid removed locally by ducting that can intersect adjoining duct at any point along the adjoining duct.
c) Sharp metal chips do not catch on the solid steel ducting system.
d) Solid metal ducting with an open slot at the top of the section that is closed along its length by a belt and opened locally by a travelling mechanism so that the intersecting metal ducting can enter at any point of the opening duct thereby eliminating any flexible mechanism coming into contact with sharp chips
e) The ducting apparatus can be used for multiple axis so that the chips can transfer direction along many ducts to arrive at a desired destination.
f) Machines with axes in excess of 100' can have the chips removed from any point by air extraction methods
g) No need to manually sweep away waste such as chips
h) Extraction apparatus can cope with any type of waste
i) Extraction apparatus is less likely to break down and require maintenance
j) Have two movable ducting systems
k) Able to have a movable ducting system which allows for a smaller waste collection system Variations Throughout the description of this specification, the word "comprise" and variations of that word such as "comprising" and "comprises", are not intended to exclude other additives, components, integers or steps.

Though this cutting machine waste extraction apparatus is shown being used with a machining cutting and thermal cutting machine, the apparatus of the present invention can be equally utilized on any machine that cuts or drills to produce any type of waste.

All ducting can be of any cross section such as for example square or circular and can include other internal and external pathway shapes as required. Additionally corners and joining ducting sections are also included to enable a smooth transition between any changes of direction of ducting. Second horizontal duct 20 and third horizontal duct 22 can be slotted along their entire length or have a series of spaced slots to allow the junction apparatus to transfer waste in as required. These slots can be any shape and be located anywhere in the duct cross section such as for example the top sides or bottom.

In relation to the vertical ducts, the first vertical duct 13 and second vertical duct 14 can have either the first vertical duct 13 being smaller in diameter than the second vertical duct 14 or vice versa. Alternatively for the vertical ducts, the smaller diameter need not be provided for the entire length but can be provided only as portion of the entire length. In yet other variations, the means to effect the vertical movement can be done in other ways such as by being deformable or being angular movable.

In another variation as seen in FIG. 5, the second different shaped junction apparatus 21 can be formed and positioned differently whereby the third horizontal duct 22 which is shown as being down low and located down near machine rails 1. This would require the second horizontal duct 20 to instead be fluidly directed downwardly through a vertical duct 34 whereby the second junction apparatus 21 would be located at the bottom of the vertical duct. This variation shows rectangular ducting sections 20, 34 and 22. The number of rollers and their orientation can be varied. As shown in the drawings the difference in height between the first horizontal duct 18, second horizontal duct 20 and third horizontal duct 22 can be varied to suit requirements.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

It will also be understood that where a product, method or process as herein described or claimed and that is sold incomplete, as individual components, or as a "kit of Parts", that such exploitation will fall within the ambit of the invention.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

What we claim is:

1. A cutting machine waste extraction apparatus for a cutting machine that cuts a plate, the cutting machine waste extraction apparatus being supported adjacent a cutting area at a cutting table during cutting of the plate, the cutting machine waste extraction apparatus comprising:
   a ducting system, wherein the ducting system comprises:
      a first duct which receives the waste from the plate;
      a second duct which receives the waste from the first duct;
   wherein the first duct is configured to be movable along the length of the second duct; and
   wherein the second duct includes a lengthwise opening which is sealed by a flexible belt, said flexible belt being deformable from sealed contact with said second duct, adjacent a junction apparatus, the junction apparatus providing a fluid connection between said first duct and said second duct;
   a ducting section through which the waste is able to flow from said first duct to said second duct, and rollers configured to create a slot opening in the second duct by lifting said flexible belt from sealed contact with the second duct in a region along the length of the second duct ahead of the ducting section with respect to a direction of travel of the ducting section,
   the rollers being further configured to lift the flexible belt over said ducting section and redirect said flexible belt back into sealed contact with said second duct in a region along the length of the second duct behind said ducting section relative to said direction of travel, said ducting section being aligned with the slot opening in the second duct to fluidly communicate therewith, and wherein a sliding seal is provided on said ducting section and configured to seal the second duct.

2. The cutting machine waste extraction apparatus as claimed in claim 1, wherein the junction apparatus has a raised cover to cover a portion of the flexible belt which is attached to the rollers, the raised cover being able to move with the junction apparatus when the junction apparatus moves along the second duct.

3. The cutting machine waste extraction apparatus as claimed in claim 2, wherein the rollers are mounted on the raised cover.

4. The cutting machine waste extraction apparatus as claimed in claim 1, wherein the first duct and the second duct are horizontally oriented.

5. The cutting machine waste extraction apparatus as claimed in claim 1, wherein the lengthwise opening of the second duct is along the top of the second duct.

6. The cutting machine waste extraction apparatus as claimed in claim 1, wherein the ducting section comprises an elbow through which the waste is able to flow from the first duct to the second duct and around which the flexible belt is directed.

7. The cutting machine waste extraction apparatus as claimed in claim 1, wherein the junction apparatus comprises a frame between a junction of the ducting section and the second duct, the frame having a perimeter.

8. The cutting machine waste extraction apparatus as claimed in claim 7, wherein the sliding seal is between the frame and the second duct, the sliding seal provided around the perimeter of the frame.

9. The cutting machine waste extraction apparatus as claimed in claim 8, wherein the junction apparatus comprises a further rubber seal that covers a gap between the perimeter of the frame and the sliding seal.

10. The cutting machine waste extraction apparatus as claimed in claim 8, further comprising a first seal piece between the belt and the slot opening, underneath a first one of the rollers, and a second seal piece between the belt and the slot opening, underneath a second one of the rollers.

11. The cutting machine waste extraction apparatus as claimed in claim 1, wherein the first duct comprises a horizontal portion proximate the junction apparatus, and comprises a vertical portion through which the first duct receives the waste.

12. The cutting machine waste extraction apparatus as claimed in claim 11, wherein the vertical portion comprises two telescoping members.

13. The cutting machine waste extraction apparatus as claimed in claim 12, wherein the junction apparatus between the first and second ducts is a first junction apparatus, and the cutting machine waste extraction apparatus comprises a second junction apparatus, between a third duct and one end of the second duct, the third duct comprising an exit, and wherein the waste is able to be drawn from the first duct to the exit by a vacuum generated by a fan.

14. A cutting machine comprising the cutting machine waste extraction apparatus of claim 1.

* * * * *